United States Patent [19]

Peters

[11] Patent Number: 5,418,941
[45] Date of Patent: May 23, 1995

[54] METHOD AND APPARATUS FOR A DYNAMIC APPLICATION TEST FACILITY

[75] Inventor: Anthony M. Peters, Bedford, Tex.

[73] Assignee: International Business Machines Corporation, Armonk, N.Y.

[21] Appl. No.: 188,501

[22] Filed: Jan. 28, 1994

[51] Int. Cl.$^6$ ............................................. G06F 11/00
[52] U.S. Cl. ...................... 395/575; 395/700
[58] Field of Search ............ 395/575, 700, 146; 371/19

[56] References Cited

U.S. PATENT DOCUMENTS

| | | | |
|---|---|---|---|
| 5,038,316 | 8/1991 | Hempleman et al. | 395/700 |
| 5,182,806 | 1/1993 | McKeeman et al. | 395/700 |
| 5,297,274 | 3/1994 | Jackson | 395/500 |
| 5,333,304 | 7/1994 | Christensen et al. | 395/575 |

*Primary Examiner*—Charles E. Atkinson
*Attorney, Agent, or Firm*—David A. Mims

[57] ABSTRACT

A dynamic application editor builds new application definition entries for and edits existing application definition entries without a need for a user to have an innate knowledge of the exact method required to invoke applications. Application definition entries describe an application's initiation, execution, procedural command language, macro syntax, and communication capabilities in an application independent manner. The dynamic application editor automatically locates, or accepts user specified existing application definition entries and presents them in a user friendly user interface for the user to edit. The user can view existing application definition entries, cut, copy and paste between application definition entries, edit and delete application definition entries, or browse entire sections of the active application definition file. Application definition entries may be entered into the dynamic application editor and tested with or without committing the entry permanently to the application definition file. If an application fails, the dynamic application editor can be used to invoke a trace environment to detect the reasons for failure of an application. Once the application definition entry is corrected, the dynamic application editor allows the permanent storage of the entry in an application definition file.

18 Claims, 6 Drawing Sheets

METHOD AND APPARATUS FOR A DYNAMIC APPLICATION TEST FACILITY

CROSS REFERENCE TO RELATED APPLICATION

This application is related in subject matter to the following application filed concurrently herewith and assigned to a common assignee:

Application Ser. No. 08/188,518, filed by A Peters entitled, "A Method And Apparatus For An Application Launching Program".

The foregoing co-pending application is incorporated herein by reference.

1. Field of the Invention

This invention relates to a data processing system, and more particularly, to a dynamic application test facility capable of testing integrated applications within a generic, dynamic application integration environment.

2. Background of the Invention

A variety of approaches have been utilized in an effort to supply desktop users with integrated applications. One approach requires that an application be installed on the computer desktop. Thereafter, the application can be launched by double-clicking on an application icon or associated data file. Many tools exist to allow users to create or choose ready-made icons and establish a link between the icon and the application. Another approach for supplying users with integrated applications is seen in the form of suites. Suites are collections of desktop productivity applications such as word processors, spreadsheets, databases, graphics and mail applications, usually from the same manufacturer. These suites offer users a bargain price, a consistent interface, and some degree of integration among packages. While the user is relieved from the task of having to port code between application packages, users must still grapple with the addition of applications to the suite that are not from the same manufacturer.

While application developers have been working strenuously to get integrated applications on the desktop, integrated applications that test one application calling another application efficiently and correctly are in short supply. Known techniques are incapable of making the necessary system operations transparent to the user. One integration method, Personal for Windows manufactured by Reference Point Software, allows a user to catalog existing or newly created documents via use of an "IndexCard". A unique feature of the "IndexCard" is the background indexer which makes indexing transparent to any application user. Basic information such as file name, file path, and the application linked to the document is created automatically. While capable of serving basic document-management purposes, the technique is not capable of efficiently and correctly testing integrated applications within a generic application environment.

Consequently, a technique is needed to efficiently test integrated applications within a generic, dynamic application integration environment.

SUMMARY OF THE INVENTION

This invention provides a method and apparatus for efficiently and correctly testing integrated applications within a generic, dynamic application integration environment. This is accomplished with an editor which builds new application definition entries for and edits existing application definition entries without a need for a user to have an innate knowledge of the language or system procedures required to automatically invoke applications. The application definition entries describe an application's initiation, execution, procedural command language, macro syntax, and communication capabilities in an application independent manner. The dynamic application editor automatically locates, or accepts user specified existing application definition entries and presents them in a user friendly user interface for the user to edit and execute. The user can view existing application definition entries, cut, copy and paste between application definition entries, edit and delete application definition entries, or browse entire sections of the active application definition file. Application definition entries may be entered into the dynamic application editor and tested with or without committing the entry permanently to the application definition file. If an application fails, the dynamic application editor can be used to invoke a trace environment to detect the reasons for failure of the application. Once the application definition entry is corrected, the dynamic application editor allows the permanent storage of the entry in an application definition file.

DETAILED DESCRIPTION

The dynamic application editing facility is an editor and testing facility which can build new application definition entries for and edit existing ones without the user having to have an innate knowledge of the language required to automatically invoke applications. The dynamic application editing facility can automatically locate, or accept user specified existing application definition entries and present them in a friendly user interface for the user to edit. The user can view existing entries, cut, copy and paste between entries, edit and delete entries, or browse entire sections of the active application definition file. Applications may be entered into the editor and executed in a generic, dynamic application integration environment with or without committing the entry to the application definition file. For the purpose of this invention, a generic, dynamic application environment is a collection of applications running together in which the applications were not originally tightly coupled to each other as in a "suite". This invention allows applications to interact with each other as though they were part of a suite by integrating them into a tightly coupled collection using the techniques of this invention. It should be noted that "suites" are usually developed by one developer/manufacturer and are tightly coupled by the "suite's" developer/manufacturer. If a different developer wants to develop another suite of applications that use diverse applications from many software developers, then that developer must integrate the diverse applications using the existing external interfaces that the specific tools (e.g., Macro Languages) and operating system platforms (e.g., Windows, DDE, etc.) provide.

The application definition file is a repository containing the description for an application's initiation, execution, procedural command language (e.g., command language, macro syntax, etc.), communication capabilities and any other additional information about an application. The grammar describing the applications must convey parameters for application invocation and execution based on the prevailing conditions and requirements at execution time and for dynamic update as well. An example of this grammar is shown in Table A. As shown in Table A, the complexity of the grammar illuminates the necessity of the editor and test facility of this invention for integrating applications at a generic, dynamic level. It can be clearly seen that without the editor and test facility of this invention, integrating such applications requires a very detailed, innate knowledge of each application. Using this invention, integration and testing of multiple applications may be carried out with only a cursory knowledge of how the applications work.

this application is requesting. The macrofile parameter (e.g., Macroplay(ovxevn)) specifies the name of the application macro to be sent to the application program. The macrofile parameter is the name of an application macro to be executed by the application. The macfile parameter (e.g., FileOpen(FileName:"*FILENAME GOES HERE*") specifies the name of the application macro to be sent to the application with a DDEEXECUTE command in the case where the application is to be invoked with a parameter(s). The actual parameter is inserted in place of the text between the delimiters specified by the delim parameter 22. It will be appreciated by those skilled in the art that while the above-mentioned parameters are for a DOS/WINDOWS environment, the parameters are application dependent and not operating system dependent. It will also be appreciated that the grammar may be initially set up by a system administrator and made available for an end user. Finally, the delim parameter 22 (e.g., *#) specifies the delimiter token(s) which may be used to separate the actual parts of the application macro from part of the macro which is to be updated with the execution parameter string. Everything between the delimiters tokens is substituted for by the runtime parameter being passed to the application. This means the string inside the delimiters is substituted with the real information that is only

TABLE A

WPWIN=edname=WPWIN.EX  edreal=WPWINFIL.exe  ddesys=Wordperfect
  ddetopic=COMMANDS  macrofile=Macroplay(ovxenv)
  macfile=Fileopen(FileName:"*FILENAME GOES HERE*")  delim=*#
WINWORD=edname=WINWORD.EXE  edreal=WINWORD.EXE  ddesys=WINWORD
  ddetopic=SYSTEM
  macfile=[Fileopen .name="*filename goes here*"]
  macrofile=[ToolsMacro .name="ovxsend", .show=1, .run]  delim=
*#
AMIPRO=edname=AMIPRO.EXE  edreal=AMIPROUI  ddesys=AMIPRO
ddetopic=SYSTEM  macrofile=   macfile=[FileOpen("#filename
goes here#",1,"")]  delim=*#
EXCEL=edname=EXCEL.EXE  edreal=EXCEL  ddesys=EXCEL  ddetopic=
SYSTEM  macrofile=  delim*#  macfile=[Open("*FILENAME GOES
HERE*")]
123W=edname=123w.exe  edreal=MAIN123w.exe.  ddesys=123W
ddetopic=Untitled  macnofile=   macfile=[RUN({ALT)fo(ALT "n"}
*FILE NAME HERE*{TAB 4}~)]  delim=*#

The grammar shown in TABLE A starts with the name of the application. Taking the first application (e.g., WPWIN) in the application definition file, the entry consists of the edname (e.g., WPWIN.EXE) parameter which specifies the name of the program that is to be executed. The edname parameter is separated from other parameters for the application by the delimiter " ". The next parameter edreal (e.g., WPWINFIL.EXE) specifies the name of the program that ends up actually getting executed. The edname parameter, for some applications, is only a launching shell application for the real main executable program of an application. For example, WordPerfect for Windows which is manufactured by the WordPerfect Corporation, is initiated by WPWIN.EXE but its main executable file is WPWINFIL.EXE. Likewise Lotus 1-2-3 for Windows, manufactured by the Lotus Corporation, is initiated by 123W.EXE but its main executable file is MAIN123W.EXE. The ddesys parameter (e.g., WORDPERFECT) specifies the name of the DDE (Dynamic Data Exchange) server application. This parameter is followed by the ddetopic parameter (e.g., COMMANDS) which specifies the DDE topic of the DDE conversation. One skilled in the art will appreciate that DDE, and other protocols, support multiple conversations. The ddetopic indicates the specific conversation which available at runtime. For example, an editor may be called with a filename. The filename is maintained by a placeholder string until the actual data is known and the application is called.

Figure 1:
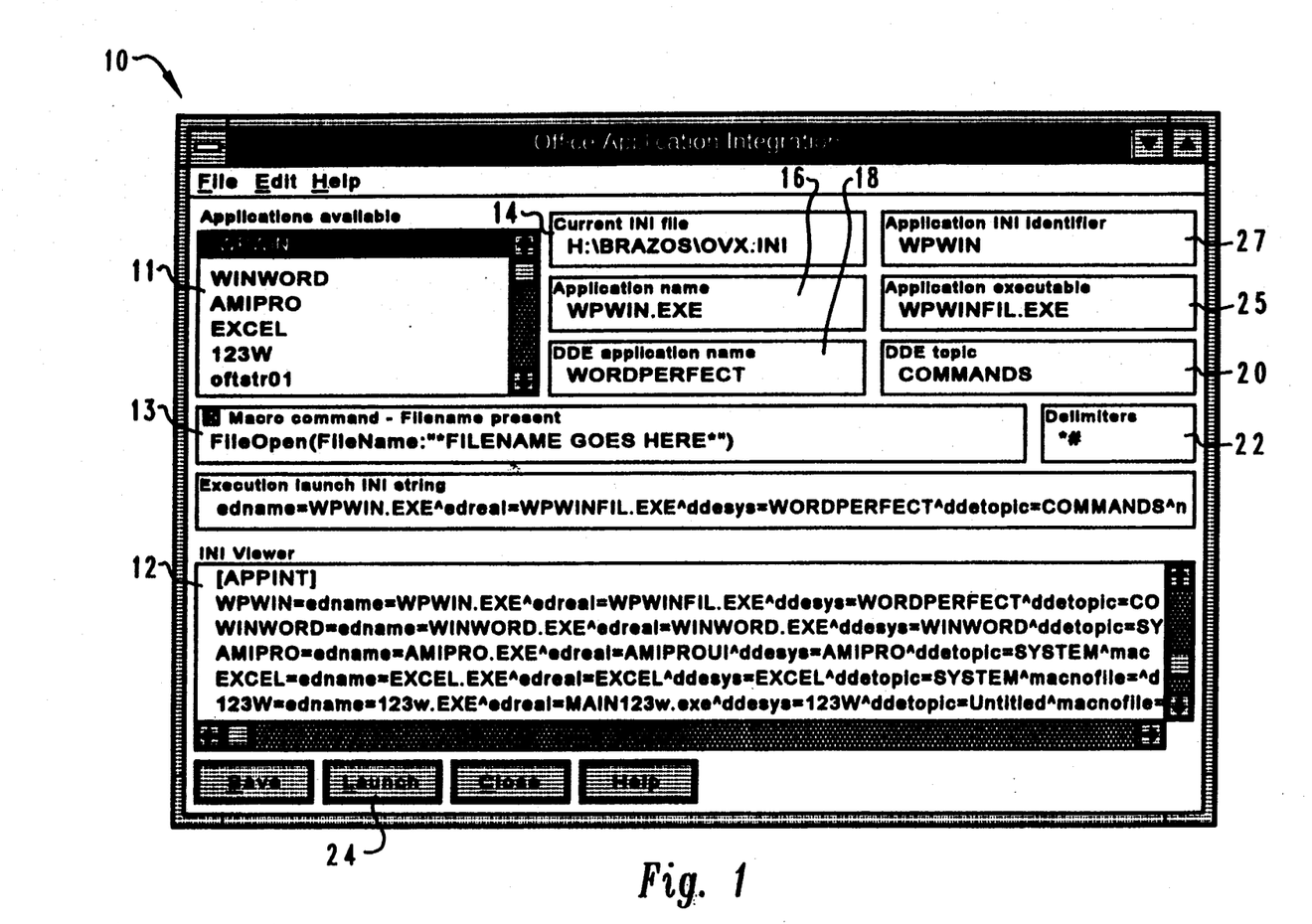
FIG. 1 depicts a user entry panel for a dynamic application test facility editor.

Turning now to the figures, and particularly FIG. 1, there is shown an entry panel 10 for the dynamic application editing facility editor. The application entries supported by the editor are displayed in the applications available listbox 11. Each of the listbox entries 11 corresponds to an application definition file (APPINT) entry 12. The APPINT entry 12 describes how to execute the application on a platform. The application name field 18 specifies the APPINT edname entry for the application which specifies the name of the program that is to be executed. The application executable field 25 specifies the APPINT edreal entry for the application which specifies the name of the program that ends up actually getting executed. The DDE application name 16 field specifies the APPINT ddesys entry for the application which specifies the name of the DDE server application. The DDE topic field 20 specifies the APPINT ddetopic entry for the application which specifies the DDE topic of the DDE conversation. The DDE macro command field 13 specifies the APPINT macrofile and macfile entries for the application which specifies the name of the application macro to be sent to the application without or with parameters, respectively. The actual parameters are inserted in place of the text between the delimiters in the macro file name delimiters field 22. The APPINT's delim entry 22 specifies the delimiters tokens which may be used to separate the actual parts of the application macro from that part of the macro which is to be updated with the execution parameter string. The delimiter field 22 can specify any number of delimiter characters but a delimiter token consists of one and only one character at any one time. The application INI identifier field 27 indicates the currently active APPINT entry identifier. This token is also the string which identifies the application to an application launcher. The current INI file field 14 specifies the path and filename of the file which is currently being updated by the editor program. The invention is also capable of supporting multiple files. A user can launch an application by manipulating the launch 24 button to immediately execute the application from the editor. One skilled in the art will appreciate that any of a number of well known editors may be modified to perform the indicated operations on the afore-mentioned parameters. One such editor is the WordPerfect editor manufactured by the WordPerfect Corporation.

Figure 2:
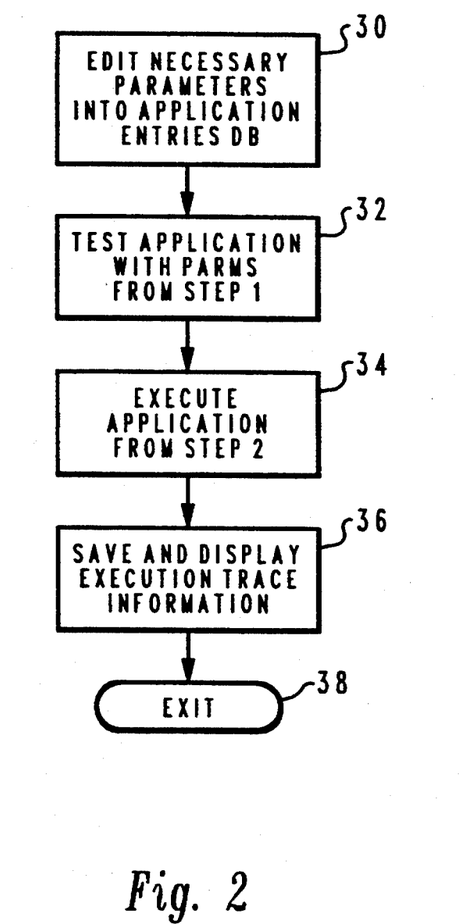
FIG. 2 depicts the major process steps for a dynamic application test facility editor.

Turning now to FIG. 2, a flow diagram is shown for the major steps of the dynamic application test facility editor. The procedure starts at Block 30 where the necessary parameters are edited in an application definition entries file. At Block 32, the application is tested with the parameters entered at Block 30. The procedure then proceeds to Block 34 where the application is executed. At Block 36, the procedure saves and displays the execution information and exits at Block 38.

Figure 3:
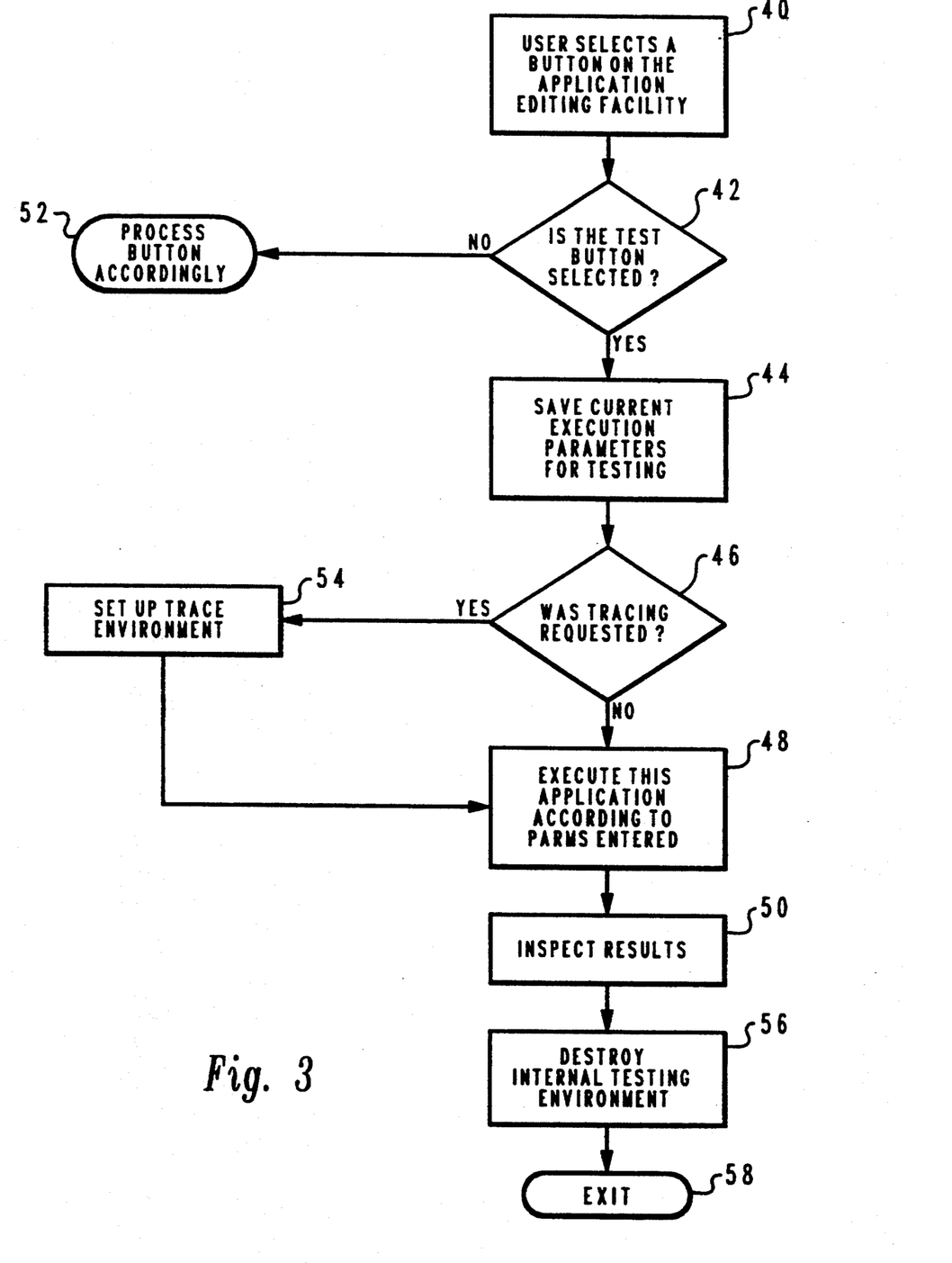
FIG. 3 shows the process steps for testing applications with their parameters using the dynamic application test facility editor.

With reference now to FIG. 3, at Block 40 the user selects a button on the application editing facility editor. A test is conducted at Block 42 to determine if the test button is selected. If NO, at Block 52 the button is processed accordingly. If YES, at Block 44 the procedure saves the current execution parameters for testing. At Block 46, the procedure checks to determine if tracing is requested. If YES, at Block 54 the procedure causes a setup of the trace environment. Else, at Block 48, the procedure executes the application according to the parameters entered. At Block 50, the procedure inspects the results. At Block 56 the procedure destroys the internal testing environment and exits at Block 58.

Figure 4:
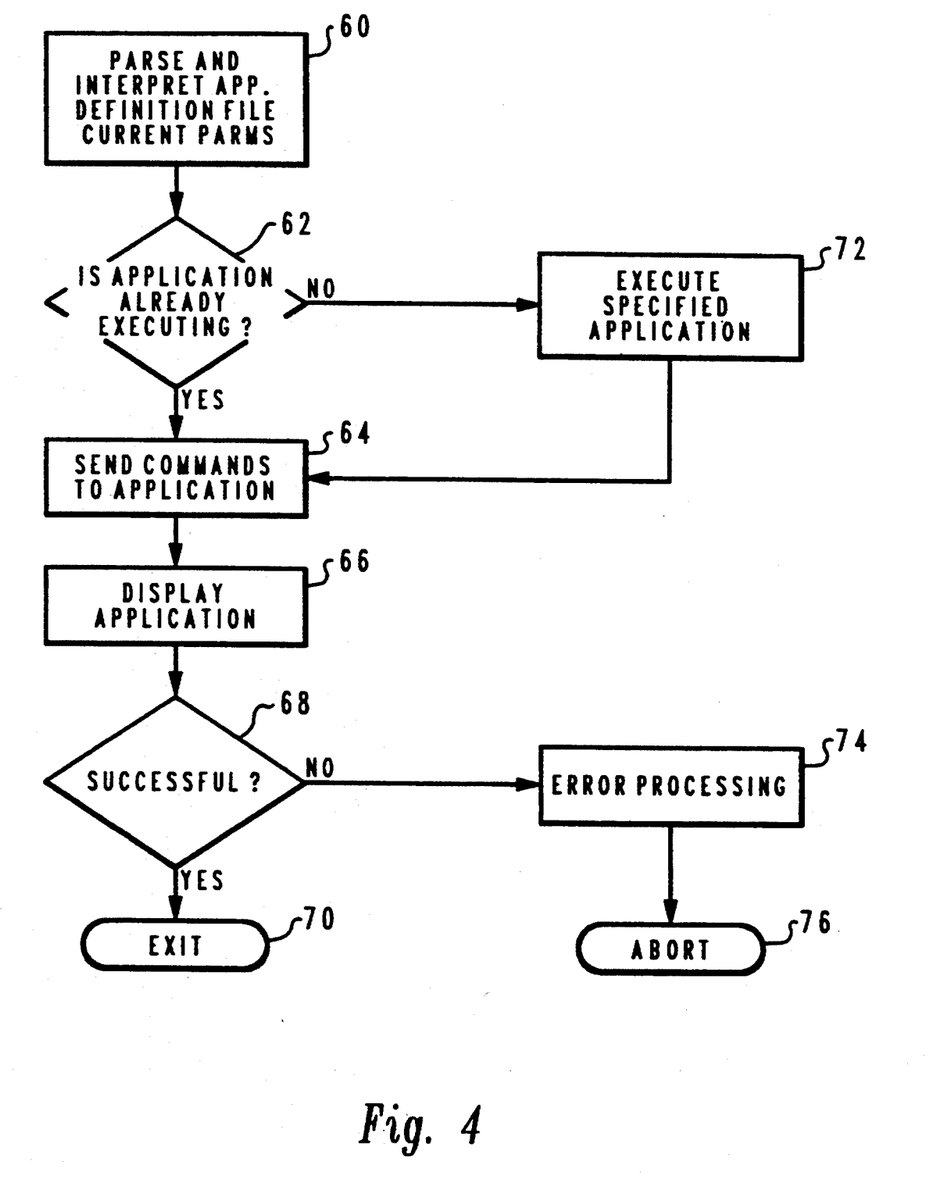
FIG. 4 shows the steps for executing an application using the dynamic application test facility editor.

Turning now to FIG. 4, at Block 60 the procedure parses and interprets the current parameters of the application definition file. The editor parses and interprets the parameters using the following steps:

STEP 1: Break the parameters in the application definition file entry into each of the individual parameters (e.g., edname, edreal, etc. ).

STEP 2: Store each of the individual parameters in internal tables, containing only the actual values necessary at execution.

STEP 3: Search the operating system tables using the edreal name to determine if the target application is already executing. Start the application if it is not executing.

STEP 4: Establish and open a conversation with the target application using the ddesys and ddetopic entries.

STEP 5: Instruct the target application how application integration is to be accomplished using the macfile and nomacfile parameters.

At Block 62, the procedure checks to see if the application is already executing. If NO, then at Block 72 the procedure executes the specified application. Else, at Block 64 the procedure sends commands to the application. The procedure then causes the application to be displayed as shown in Block 66. At Block 68 the procedure checks to see if the display was successful. If YES, the procedure exits at Block 70. Else, at Block 74, the procedure indicates a processing error and the procedure aborts at Block 76.

Figure 5:
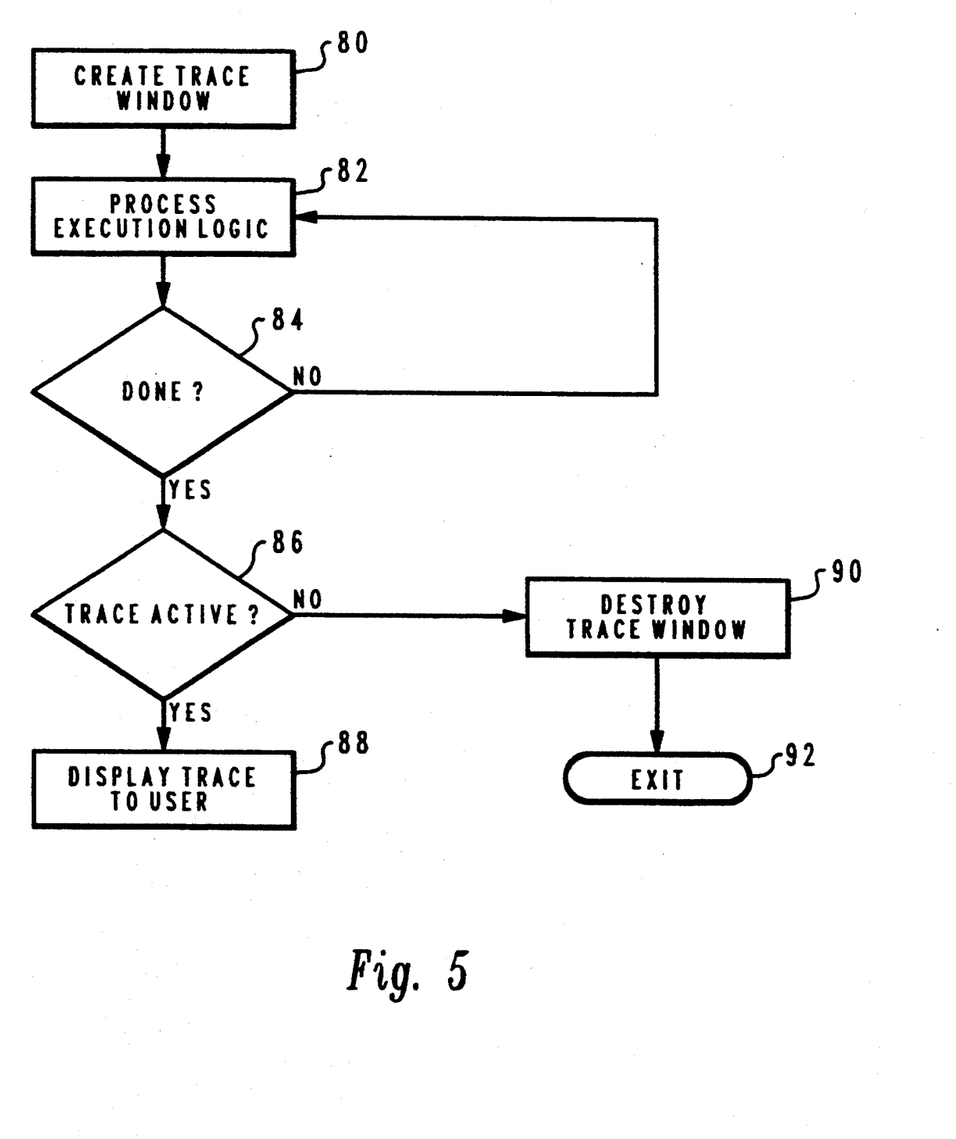
FIG. 5 shows the steps for setting up a trace environment in the dynamic application test facility.

With reference now on FIG. 5, a flow diagram is shown for setting up the trace environment. At Block 80, the procedure creates a trace window. The execution logic is then processed at Block 82. At Block 84, the procedure checks to see if the processing is completed. If NO, the procedure returns to Block 82. If YES, the procedure moves to Block 86 and checks to see if there is any trace activity. If YES, processing proceeds to Block 88 where the display trace is presented to the user. At Block 90, the procedure destroys the trace window and exits at Block 92 if no trace activity is detected.

Figure 6:
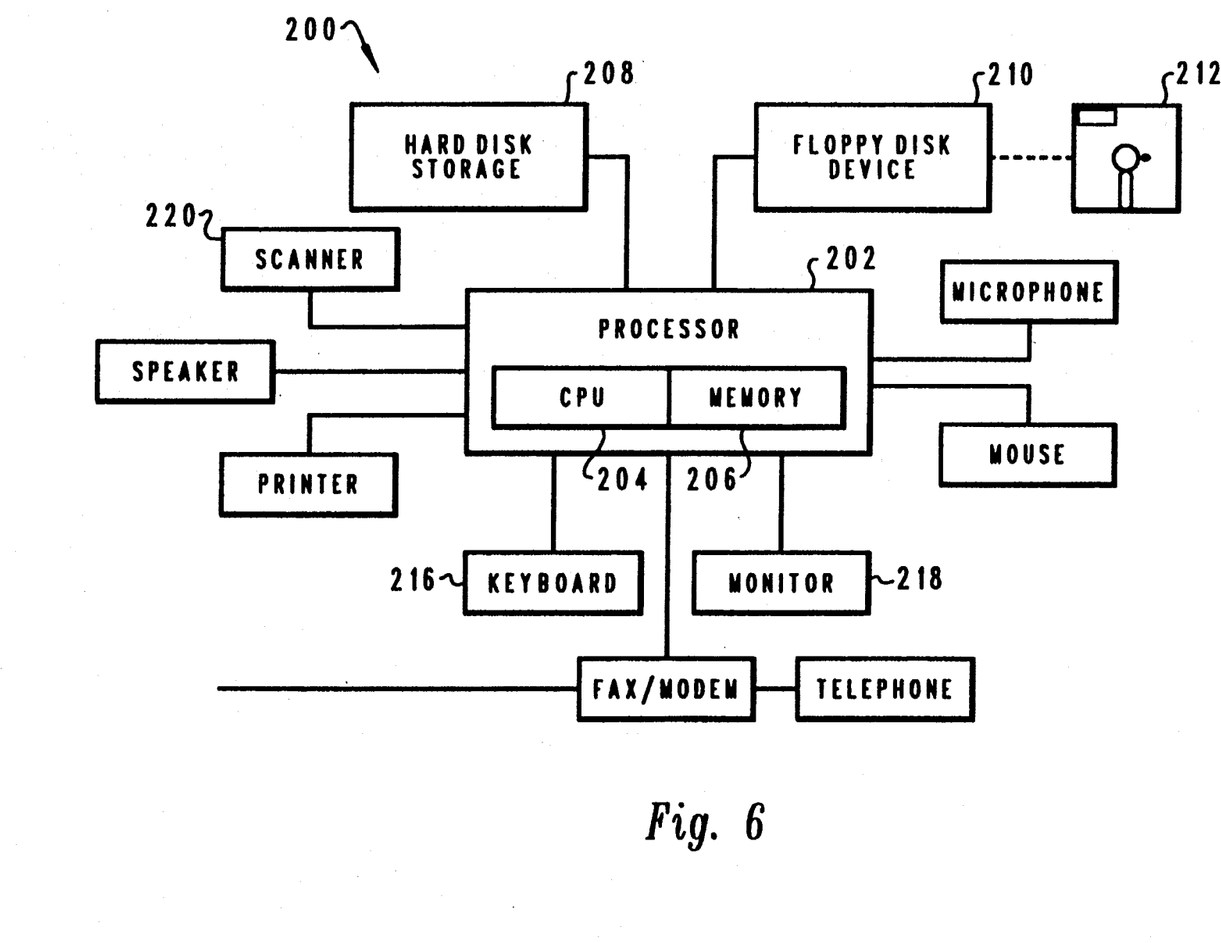
FIG. 6 shows a data processing system where the invention may be practiced.

Turning now to FIG. 6, a data processing system 200 is shown where the operation of the present invention is carried out. The data processing system 200 consists of a processor 202 containing a CPU 204 and memory 206. Attached to the processor 202 is a scanner 220 for inputting information into the data processing system 200. In addition, a keyboard 216 is provided for entry of data by a user. Permanent storage is provided by hard disk storage 208 along with removable storage in the form of a floppy disk device 210. Program information or data may be inputted to the system by a floppy disk 212. A display device 218 is also provided to permit a user to view information and data processing within the data processing system.

As can be seen, the dynamic test facility provides a quick and simple approach to test execution characteristics of one application calling another to another application. The user may immediately test out the dynamic integration of the programs by actually invoking the subject application according to the newly defined execution characteristics. Dynamic application testing is carried out by defining the execution characteristics for an application in an application definition entries file. This is easily done with the editor. The application definition file is dynamically modified in real time in a manner transparent to the user to simulate the actual conditions of application invocation. When application integration testing is completed, these conditions are automatically removed. The user can make the successful combination of application execution characteristics permanent entries in the application definition file. One skilled in the art will appreciate that surfacing the editor's user interface of the dynamic application test facility may be accomplished with a graphical button, pull-down menu, inclusion of a toolbar, etc. The user may test multiple applications interactions by simply invoking it. The user is therefore provided immediate, visual testing of applications integrated together.

While the invention has been particularly shown and described with reference to preferred embodiments thereof, it will be understood by those skilled in the art that various changes in form and details may be made therein without departing from the spirit and scope of the invention.

What I claim is:

1. A method, implemented in a data processing system, of testing integrated applications within a dynamic application integration environment, comprising:
   providing a dynamic application test editor for editing an application definition entry to execute an one of said integrated applications in said data processing system;
   editing a parameter of said application definition entry with said dynamic application test editor for said one of said integrated applications by a user of said data processing system;
   executing said one of said integrated applications with said editor by said user within said data processing system; and
   initiating a trace environment for said one of said integrated applications with said editor by said user within said data processing system to save the execution state of said one of said integrated applications.

2. The method of claim 1 wherein the step of initiating a trace environment includes saving and displaying to the user of said data processing system the execution state of said one of said integrated applications.

3. The method of claim 1 wherein the step of initiating a trace environment includes saving said parameter of said one of said integrated applications with said editor.

4. The method of claim 1 wherein the step of initiating a trace environment further includes the step of destroying the trace environment following displaying it to said user.

5. The method of claim 1 wherein the step of executing said one of said integrated applications includes parsing and interpreting the application definition entry for said one of said integrated applications by said editor.

6. The method of claim 1 wherein the step of executing said one of said integrated applications includes the step of determining if said one of said integrated applications is currently executing within said data processing system.

7. The method of claim 1 wherein the step of executing said one of said integrated applications includes sending commands for said one of said integrated applications to an operating system to execute said one of said integrated applications in said integrated environment.

8. The method of claim 1 wherein the step of executing said one of said integrated applications includes displaying the execution of said one of said integrated applications by said editor to said user of said data processing system.

9. The method of claim 8 wherein the step of executing said one of said integrated applications includes detecting the display of said one of said integrated applications is in error and reporting the status to said user of said data processing system.

10. An apparatus for testing integrated applications within a dynamic application integration environment, comprising:
    means for providing a dynamic application test editor for editing an application definition entry to execute an one of said integrated applications in said data processing system;
    means for editing a parameter of said application definition entry with said dynamic application test editor for said one of said integrated applications by a user of said data processing system;
    means for executing said one of said integrated applications with said editor by said user within said data processing system; and
    means for initiating a trace environment for said one of said integrated applications with said editor by said user within said data processing system to save the execution state of said one of said integrated applications.

11. The apparatus of claim 10 wherein the means of initiating a trace environment includes means for saving and displaying to the user of said data processing system the execution state of said one of said integrated applications.

12. The apparatus of claim 10 wherein the means of initiating a trace environment includes means for saving said parameter of said one of said integrated applications with said editor.

13. The apparatus of claim 10 wherein the means of initiating a trace environment further includes means for destroying the trace environment following displaying it to said user.

14. The apparatus of claim 10 wherein the means for executing said one of said integrated applications includes means for parsing and interpreting the application definition entry for said one of said integrated applications by said editor.

15. The apparatus of claim 10 wherein the means for executing said one of said integrated applications includes means for determining if said one of said integrated applications is currently executing within said data processing system.

16. The apparatus of claim 10 wherein the means for executing said one of said integrated applications includes means for sending commands for said one of said integrated applications to an operating system to execute said one of said integrated applications in said integrated environment.

17. The apparatus of claim 10 wherein the means for executing said one of said integrated applications includes means for displaying the execution of said one of said integrated applications by said editor to said user of said data processing system.

18. The apparatus of claim 17 wherein the means for executing said one of said integrated applications includes means for detecting the display of said one of said integrated applications is in error and reporting the status to said user of said data processing system.

* * * * *